United States Patent [19]

Okamura et al.

[11] 4,371,131
[45] Feb. 1, 1983

[54] MAGNETIC TAPE CASSETTE

[75] Inventors: Masatohsi Okamura; Kimio Tanaka, both of Tokyo, Japan

[73] Assignee: TDK Electronics Co., Ltd., Tokyo, Japan

[21] Appl. No.: 210,802

[22] Filed: Nov. 26, 1980

[30] Foreign Application Priority Data

Jan. 14, 1980 [JP] Japan .................................. 55-3244

[51] Int. Cl.³ .......................... G03B 1/04; B23P 21/00
[52] U.S. Cl. .............................. 242/199; 29/DIG. 28; 29/790
[58] Field of Search ........ 242/55.19 A, 194, 197–200; 360/96, 132; 269/47, 48, 900; 403/24, 25, 209, 230; 29/525, 790, DIG. 28

[56] References Cited

U.S. PATENT DOCUMENTS

| 1,278,713 | 9/1918 | Moore | 277/78 X |
| 2,291,593 | 7/1942 | Hubbard | 403/109 X |
| 3,829,040 | 8/1974 | Nelson | 242/199 |
| 4,079,978 | 3/1978 | McMullin | 294/19 R |

Primary Examiner—Leonard D. Christian
Attorney, Agent, or Firm—Oblon, Fisher, Spivak, McClelland & Maier

[57] ABSTRACT

A magnetic tape cassette having one or more guide pole which is forcibly inserted at each end into each axial hole formed in a casing comprises an air releasing portion for releasing air during the forcible insertion of said guide pole in said axial hole.

1 Claim, 5 Drawing Figures

F I G. 1 *PRIOR ART*
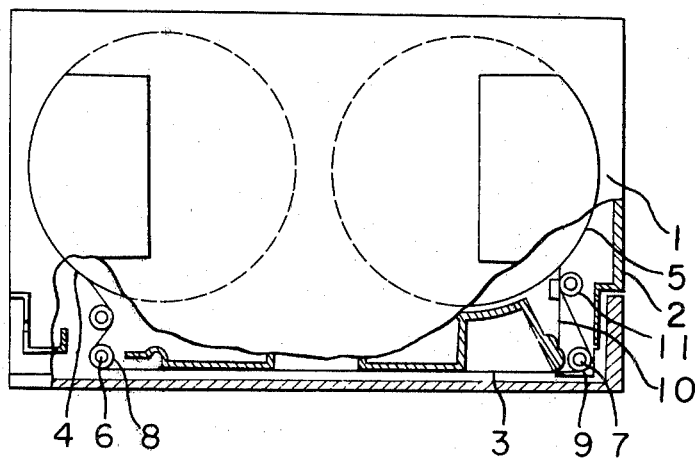
F I G. 2
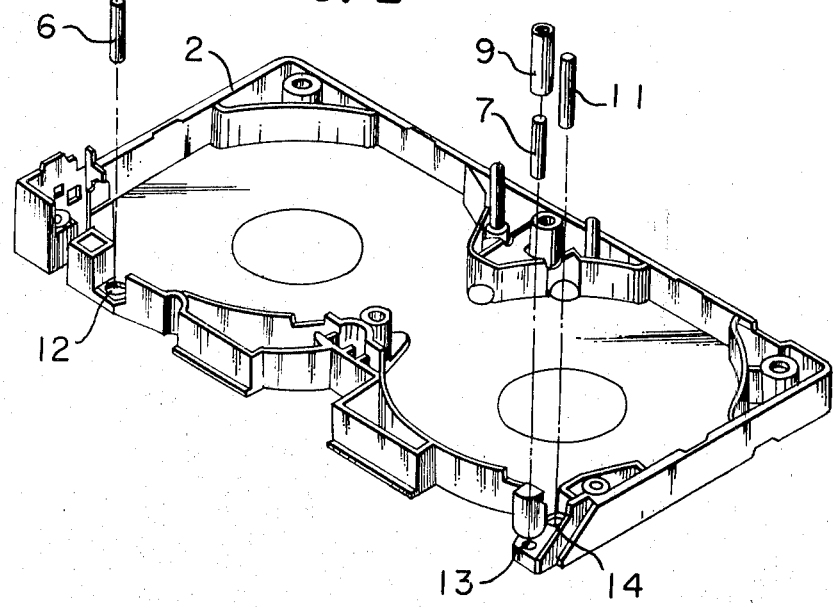

F I G. 3 PRIOR ART
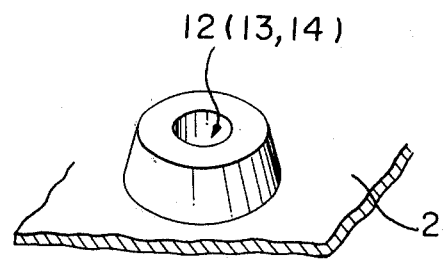
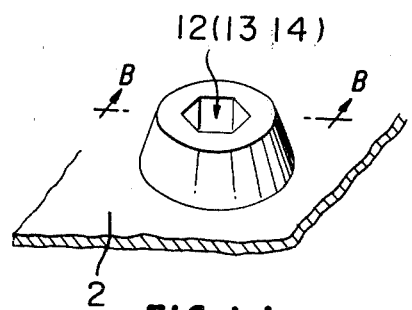
FIG. 4A
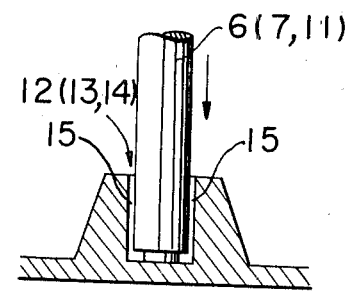
FIG. 4B

MAGNETIC TAPE CASSETTE

BACKGROUND OF THE INVENTION

1. Field of the Invention:

The present invention relates to a magnetic tape cassette such as a video tape cassette.

2. Description of the Prior Art:

FIG. 1 and FIG. 2 are schematic views of the conventional magnetic tape cassette wherein reels (4), (5) holding a wound magnetic tape (3) are positioned in the casing comprising an upper half casing (1) and a lower half casing (2) and tape guides (8), (9) supported by guide poles (6), (7), a tape pad (10) and a guide pole (11) are placed in the running path of the magnetic tape (3) between the reels (4), (5) so that the magnetic tape (3) can continuously run in contact with the tape guides (8), (9), the tape pad (10) and the guide pole (11) to be wound on the reel.

In the conventional device, the guide poles (6), (7) and (11) are respectively fixed by forcibly inserting one end into each of axial holes (12), (13), (14) previously formed in the surface of the upper half casing (1) or the lower half casing (2). The axial holes (12) to (14) of the conventional device are circular in cross-sectional shape as shown in an enlarged view of FIG. 3 and the inner diameters of the axial holes (12) to (14) correspond to the outer diameters of the guide poles (6), (7), (11) in order to prevent a loose fit of the guide poles (6), (7), (11) in the axial holes (12) to (14). It is necessary to forcibly insert the guide poles (6), (7), (11) into the holes (12) to (14) after applying a lubricant such as grease to the surface of one end of the guide poles (6), (7), (11). However, the application of the grease completely closes the gap between the inner wall of the axial holes (12) to (14) and the outer surface of the guide poles (6), (7), (11) when forcibly inserting the guide poles so that air in the holes (12) to (14) can not be released and remains compressed in the bottom of the axial holes. This causes the guide poles (6), (7), (11) to lift up after the forcible insertion due to the repulsive force of the compressed air thus resulting in the prevention of normal movement of the magnetic tape.

SUMMARY OF THE INVENTION

It is an object of the invention to overcome the disadvantage of the conventional magnetic tape cassette and to provide a magnetic tape cassette having a structure which assures a forcible fitting of guide poles into each axial hole.

The foregoing and other objects of the present invention have been attained by providing a magnetic tape cassette having guide poles which are forcibly inserted at each end into axial holes formed in a casing wherein each of said axial holes has an air-releasing portion for forcibly inserting each of said guide poles.

BRIEF DESCRIPTION OF THE DRAWINGS

FIG. 1 is a partially sectional plane view of the conventional magnetic tape cassette;

FIG. 2 is an enlarged schematic view of the magnetic tape cassette in a disassembled state;

FIG. 3 is an enlarged schematic view of an axial hole of the conventional magnetic tape cassette;

FIG. 4 (A) is an enlarged schematic view of an embodiment of an axial hole of a magnetic tape cassette of the present invention; and FIG. 4 (B) is a partially enlarged sectional view of the axial hole in which a guide pole is fitted, taken along line B-B in FIG. 4(A).

DETAILED DESCRIPTION OF THE PREFERRED EMBODIMENTS

Referring to the drawings, an embodiment of the present invention will be described.

FIG. 4 (A) is an enlarged schematic view of an axial hole of a magnetic tape cassette of the present invention. In this embodiment, the sectional view of axial holes (12) to (14) in which guide poles (6), (7), (11) are respectively fitted, is hexagonal shape. When cylindrical guide poles (6), (7), (11) are forcibly inserted into the axial holes (12) to (14), having such sectional view, each of air-releasing portions (15) is provided between the outer periphery of each of the guide poles (6), (7), (11) and each corner of the hexagonal hole to prevent the presence of air in the axial holes (12) to (14). It is possible to provide sufficiently high strength for fitting them, since the outer periphery of each of the guide poles (6), (7), (11) is supported in press-contact with each inner surface of each of the hexagonal holes.

The sectional view of the axial holes (12) to (14) can be triangular, square or other polygonal shape. It is preferable to form the hexagonal or the octagonal axial hole from the viewpoint of the functon for holding the guide poles (6), (7), (11), the area for releasing air from the air-releasing portion (15), the easy assembling work for the forcible fitting and the easy molding. The sectional view of the axial hole is not limited to the polygonal shape, but can be any other shape having at least one air releasing portion sufficient to release air from the axial hole. such an axial hole can be formed by providing a vertical groove in the inner wall of circular axial holes (12) to (14) so as to release the air from the groove or by providing a small aperture in the bottom of the axial holes (12) to (14) to form the air releasing portion.

As described above, a magnetic tape cassette of the present invention comprises guide poles which are forcibly inserted at each end into axial holes formed in a casing in which said holes have an air releasing portion for releasing air during the forcible inserion of the guide poles. Accordingly, when the guide poles are respectively forcibly inserted into the axial holes, air in the axial holes is released outside from the air releasing portion to prevent the lifting up of the guide poles forcibly inserted; thus a magnetic tape cassette assuring guide poles fixed in the axial holes can be obtained.

We claim:

1. A magnetic tape cassette comprising:
   a cassette casing defining at least one internal boss, each said boss having a recess defining recess walls;
   a tape guide pole forcibly insertable into each said recess; and
   means for releasing air during the forcible insertion of each said pole in each said recess, said means for releasing including a circular cross section for at least the portion of each said pole which is insertable in said recess, and a polygonal cross section for at least a portion of said walls of each said recess,
   wherein the flat surfaces of said walls of each said polygonally shaped recess forcibly grip each said pole and the intersections of said flat surfaces permit air to escape.

* * * * *